July 14, 1942.　　　C. A. CARLSON　　　2,289,482
SIGNAL
Filed Aug. 6, 1938　　　2 Sheets-Sheet 1
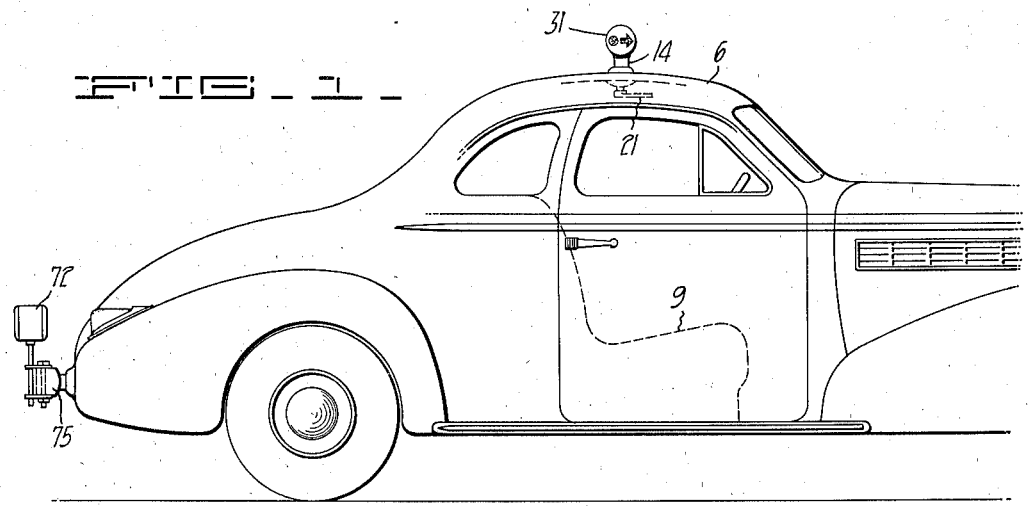
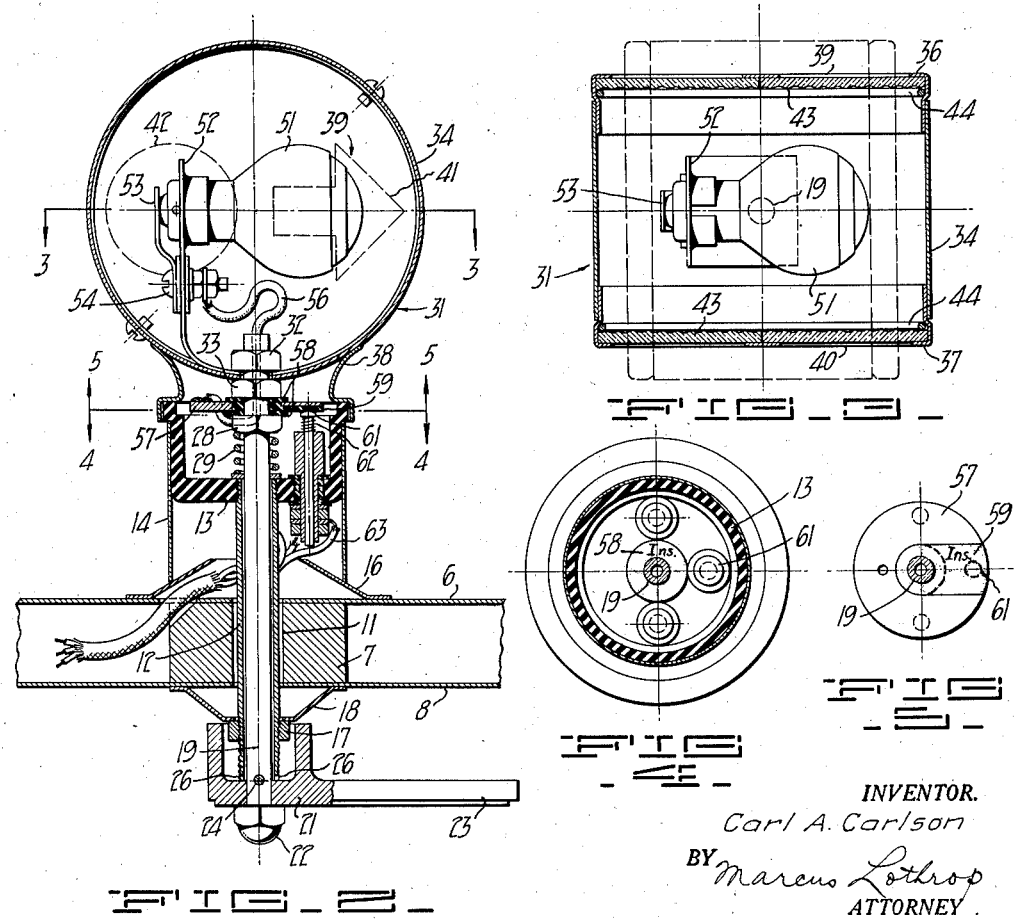
INVENTOR.
Carl A. Carlson
BY Marcus Lothrop
ATTORNEY.

July 14, 1942.  C. A. CARLSON  2,289,482
SIGNAL
Filed Aug. 6, 1938  2 Sheets-Sheet 2
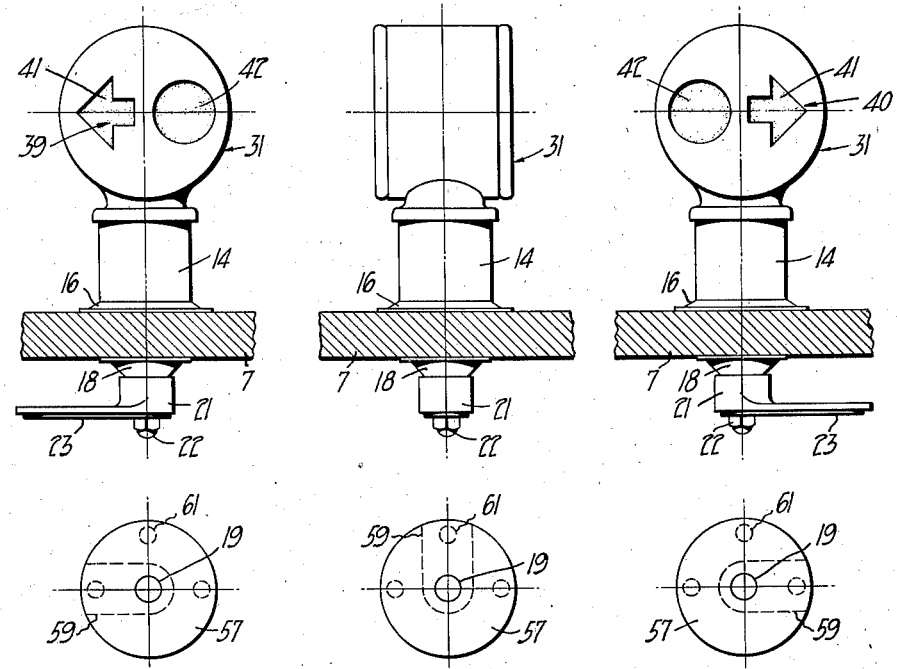
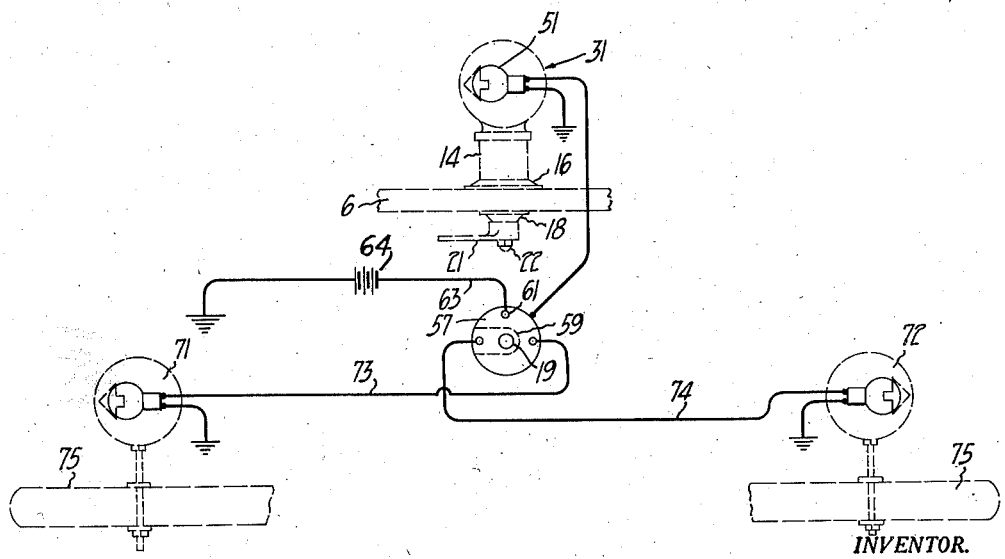
INVENTOR.
Carl A. Carlson
BY Marcus Lothrop
ATTORNEY.

Patented July 14, 1942

2,289,482

UNITED STATES PATENT OFFICE 2,289,482

SIGNAL

Carl A. Carlson, San Francisco, Calif.

Application August 6, 1938, Serial No. 223,476

1 Claim. (Cl. 177—329)

My invention relates to signalling means adapted to be manually operated, and is especially intended for installation on vehicles such as automobiles.

It is an object of my invention to provide a signal which is readily visible at all points around the vehicle on which it is installed.

Another object of my invention is to provide a signal which is readily operable by the vehicle driver.

Another object of my invention is to provide a signal which can readily be installed on any standard, closed automobile.

A further object of my invention is to provide a signal which is simple and economical to manufacture and maintain.

A further object of my invention is to provide a signal the indication of which is immediately understandable by an observer.

The foregoing and other objects are attained in the embodiment of the invention illustrated in the drawings, in which:

Fig. 1 is a side elevation of a portion of a vehicle with the signal of my invention installed thereupon;

Fig. 2 is a cross-section on a vertical, central plane through the installed signal of my invention;

Fig. 3 is a cross-section, the plane of which is indicated by the line 3—3 of Fig. 2;

Fig. 4 is a cross-section the plane of which is indicated by the line 4—4 of Fig. 2;

Fig. 5 is a cross-section the plane of which is indicated by the line 5—5 of Fig. 2;

Fig. 6 is a rear elevation of the signal of my invention in one position, indicating a left-hand turn;

Fig. 7 is a rear elevation of the signal of my invention indicating no departure from the course being followed;

Fig. 8 is a rear elevation showing the signal of my invention in a position to indicate a right-hand turn of the vehicle;

Fig. 9 is a view similar to Fig. 5, showing the contacting mechanism in a position corresponding to the signal position of Fig. 6;

Fig. 10 is a view similar to Fig. 5, showing the contactor in a position corresponding to the signal position of Fig. 7;

Fig. 11 is a view similar to Fig. 5, and showing the contactor in a position corresponding to the signal position of Fig. 8;

Fig. 12 is a wiring diagram showing satisfactory electrical connections for my signal.

In its preferred form, the signal of my invention is intended for use on a vehicle and includes a housing adapted to be mounted on the top of the vehicle for rotation about a vertical axis, the housing being substantially drum-shaped and having a pair of opposite faces on which indicia are arranged for interior illumination, and also includes a handle disposed within the vehicle adjacent the driver's position by means of which the vehicle driver can readily orient the signal.

While the signal of my invention is susceptible of installation under many different circumstances and many different environments, it is particularly useful in connection with an automobile having a closed body, such as is shown in Fig. 1. The body includes a roof 6 in which various structural members 7 are situated and has an inner lining 8 either of cloth or of metal. In accordance with my invention, I preferably pierce the roof 6 in a vertical direction and substantially above the driver's seat 9 by a bore 11 which extends entirely through the vehicle top. Through such bore I dispose a tube 12 the upper end of which is threaded into engagement with a cup 13 which bears upon a cylindrical pedestal 14 having a flared base 16 which is in abutment with the vehicle roof 6. The lower end of the tube 12 is threaded to receive a lock nut 17 which presses a conical washer 18 into clamping engagement with the interior lining 8 of the vehicle top, so that when the nut 17 is tightened the tube 12 is firmly retained in vertical position substantially above the driver's seat and piercing the roof of the vehicle.

Disposed within the tube 12 is a rod 19, at its lower end carrying a handle 21 retained in position by a cap nut 22 and having an operating extension 23 which is held in a selected position with respect to the shaft 19 by a projecting diametral pin 24. In order that the handle 23 and, correspondingly, the rod 19 will be held in any of at least three selected positions, I preferably provide the lower terminus of the tube 12 with a series of diametral notches 26 into which the pin 24 can fit to restrain the rod 19 from rotation with respect to the tube; but, in order that such restraint will be resilient and permit desired rotation of the rod and the handle 23, the axial movement of the rod is restrained, within a limited range only, by a coil spring 29 interposed between the cup 13 and a nut 28 on the rod 19.

The upper portion of the rod is secured non-rotatably to a signal casing 31 by means of a pair of nuts 32 and 33, so that the casing rotates in unison with rotation of the rod 19. The casing itself is substantially drum-shaped, including a central annular band 34 and a pair of circular parallel faces 36 and 37. A junction member 38 is secured to the casing and blends with the contours of the pedestal 14.

Each of the side faces 36 and 37 is preferably principally of opaque material, such as metal, yet also is pierced or cut out to provide suitable indicia 39 and 40 to indicate the vehicle direction to an observer. Preferably, the indicia are as shown in Fig. 6 and 8 and incorporate an arrow 41 together with a reference figure 42, such as a circle. A plate of transparent material, such as colored or semi-reflecting glass 43, is positioned behind the apertures constituting the indicia and is held in place by a snap ring 44.

Although the signal is legible under ordinary light, as so far described, I preferably provide means for interiorly illuminating it in order to make it useful under adverse lighting conditions. Correspondingly, within the casing I situate a source of light, such as an electric lamp globe 51, which is carried in a supporting bracket 52 gripped between the nuts 32 and 33. Since the signal itself is preferably grounded by being in contact with the grounded vehicle roof 6, for example, I provide means for supply the other side of the electric circuit in the form of a spring contact 53 joined to an insulated terminal 54 carried by the bracket 52.

A lead 56 extends from the terminal through a suitable passage within the rod 19 and is joined to a contact disc 57 which is of metal and is confined between insulating washers 58 on the rod 19 and between the nuts 28 and 33. Into the disc 57 is inset an insulating segment 59 in a position sometimes to overlie a brush 61 constituted by a plunger pressed by a spring 62 against the disc 57 and mounted on the insulating cup 13. A lead 63 extends from the pin 62 to a suitable source of electromotive force, such as the vehicle storage battery 64.

In the operation of this structure, the vehicle driver ordinarily has the drum casing 34 in such a position as to appear to a following driver as shown in Fig. 7, so that no signal indicia are visible. The vehicle operator can determine this from within the car simply by feeling or observing the position of the handle 23 which is substantially parallel to the parallel plane of the indicia faces 39 and 40. Prior to negotiating a turn to the left, for example, the vehicle driver rotates the handle 23 to the left, thereby positioning the drum so that it appears to a following observer substantially as shown in Fig. 6, with the indicating arrow 41 to the left of the datum circle 42 and with the arrowhead pointing in a direction toward the left.

With the turning of the rod 19, the insulating segment 59 is moved off the conducting brush 61 so that current is supplied to the disc 57 and electricity thereby flows to the source of light 51, illuminating it so that the indicia 41 and 42 are clearly seen from behind the vehicle. At the same time the indicia on the other side of the drum are illuminated and, to an observer approaching the vehicle from the front, gives a correct indication of a left-hand turn.

After negotiating the turn the operator turns the handle 23 back to its original position, the signal being retained in either of its positions by the yielding co-operation of the pin 24 with the notch 26. When the signal is restored to its neutral or intermediate position, as shown in Fig. 7, there is a corresponding quenching of the interior illumination.

A turn to the right is preceded by a rotation of the handle 23 to the right a quarter turn, whereupon the reverse face of the signal is displayed to a following driver and electrical illumination is again effectuated. In this position the signal shows to a following vehicle driver an appropriate indication of a right-hand turn and likewise to a driver approaching from its front indicates appropriately that the vehicle is about to negotiate a turn to the right. Following this, the signal is restored to its intermediate or neutral position by returning the handle 23 to its central position, thereby simultaneously turning out the light 51.

In some installations it is desirable, in addition to the signal mounted on the vehicle roof, to have signals 71 and 72 mounted stationarily on the sides of the rear portion of the vehicle, for example at the opposite extremities of the bumper 75. In this event each of the signals includes preferably but a single indicium, preferably an arrow pointing in the appropriate direction, and the signals are so connected by electrical leads 73 and 74 that the one which, when illuminated, would give an incorrect indication of turn is removed from the electric circuit by the then positioning of the insulating segment 59 over the respective lead terminus.

I claim:

A signal for use on a vehicle having a roof over the operator's seat, comprising a tube piercing said roof over said seat and constituting a journal, clamping means on said tube engaging opposite sides of said roof, said clamping means including an insulating cup, a shaft rotatably mounted in said journal, a disc carrying electrical contacts on said shaft, a casing mounted on the upper end of said shaft, said casing bearing an indicium, an electric light in said casing for illuminating said indicium, an operating handle on the lower end of said shaft, and a brush piercing said cup and adapted to abut said contact for supplying electricity to said light.

CARL A. CARLSON.